(12) United States Patent
Hamaker et al.

(10) Patent No.: US 7,040,754 B2
(45) Date of Patent: May 9, 2006

(54) AUXILIARY EYEWEAR DISPLAY MOUNT

(75) Inventors: James Hamaker, Plano, TX (US); Greg Smith, Plano, TX (US); Chris Madden, Frisco, TX (US)

(73) Assignee: Elte Optiks U.S. L.P., Carrollton, TX (US)

( * ) Notice: Subject to any disclaimer, the term of this patent is extended or adjusted under 35 U.S.C. 154(b) by 0 days.

(21) Appl. No.: 10/767,536

(22) Filed: Jan. 29, 2004

(65) Prior Publication Data

US 2005/0128428 A1 Jun. 16, 2005

Related U.S. Application Data

(60) Provisional application No. 60/520,886, filed on Nov. 18, 2003.

(51) Int. Cl.
*G02C 1/00* (2006.01)
(52) U.S. Cl. ............... 351/158; 248/902; 211/85.1
(58) Field of Classification Search .............. 351/41, 351/158; 248/902; 211/85.1, 41.7, 85.26
See application file for complete search history.

(56) References Cited

U.S. PATENT DOCUMENTS

| | | | | |
|---|---|---|---|---|
| 4,128,224 A | * | 12/1978 | Guichard | 248/316.4 |
| 5,069,416 A | * | 12/1991 | Ennis | 248/231.81 |
| 5,082,225 A | * | 1/1992 | Nespoli | 248/231.81 |
| D371,458 S | | 7/1996 | Valls et al. | |
| 5,864,924 A | * | 2/1999 | Rodriguez | 24/3.3 |
| D426,998 S | | 6/2000 | Kidd et al. | |
| D478,227 S | | 8/2003 | Peyker | |

* cited by examiner

*Primary Examiner*—Huy Mai
(74) *Attorney, Agent, or Firm*—Storm LLP; John J. Fischer; John J. Patti

(57) ABSTRACT

The present invention discloses a unique and novel display device for attaching an auxiliary lens assembly to a primary lens assembly. A display mount is disclosed that allows auxiliary eyewear to be displayed along with the primary eyewear to which it combines. The primary lens assembly can be supported in a conventional manner in an existing display rack. The auxiliary eyewear display mount is attachable to the bridge portion of the primary lens assembly with a hand-operated clamp. An arm extends from the clamp to an auxiliary cradle that supports the auxiliary lens assembly.

7 Claims, 4 Drawing Sheets

AUXILIARY EYEWEAR DISPLAY MOUNT

RELATED ART

This application claims priority to U.S. Provisional Patent No. 60/520,886, which was filed on Nov. 18, 2003.

TECHNICAL FIELD OF INVENTION

The present invention relates to eyewear, and in particular, to a design for an auxiliary eyewear display mount. More specifically, the present invention discloses a display mount that allows auxiliary eyewear to be displayed along with the primary eyewear it is designed to combine with. The primary lens assembly can be supported in a conventional manner in an existing display rack. The auxiliary eyewear display mount is attachable to the bridge portion of the primary lens assembly with a hand-operated clamp. An arm extends from the clamp to an auxiliary cradle that supports the auxiliary lens assembly.

BACKGROUND OF THE INVENTION

The eyewear market provides numerous options for people who rely on eyewear in their daily lives. The multitude of different requirements that individuals have, has created a large market of auxiliary lens systems of eyewear. In these systems, a primary lens assembly is augmented by an auxiliary lens assembly. The combinations provide numerous options for satisfying individual requirements for visual assistance and protection.

An example of the utility of combining a primary lens assembly with an auxiliary lens assembly is when the primary lenses are corrective lenses and the auxiliary lenses are light transmission reducing lenses, for example, a polarizing, absorbing, refracting, photochromatic, or reflecting lenses, or any combination thereof (i.e., sunglasses). Another example is when the primary lenses are corrective lenses and the auxiliary lenses are impact resistant safety lenses.

The recent surge in popularity of these devices has created a need for a means to display the devices for retail selection and purchase. Presently, there are no devices available for conveniently displaying to the prospective buyer, both the primary and auxiliary lens assemblies, in a manner that allows the prospective buyer to see how the primary and auxiliary lens assemblies together, and that utilizes existing displays.

Presently, numerous display systems permit display and accessibility to a single lens assembly. For example, U.S. Pat. No. D478,227 S to Peyker discloses an ornamental design for a display case for eyewear. U.S. Pat. No. D426,998 to Kidd, discloses another ornamental design for a display case for eyewear. The principal disadvantage of these designs is that they only support a primary lens assembly, and are not capable of displaying an auxiliary lens assembly, or a primary and auxiliary lens assembly combination.

U.S. Pat. No. Des. 371,458 discloses an eyewear support for a display tray. While this support is limited to working in conjunction with tray display system, it also is limited to supporting a singular primary lens assembly.

Auxiliary eyewear systems such as those described above can only support a primary lens assembly to the exclusion of the auxiliary lens assembly. Most of the various prior art designs cannot support an auxiliary lens assembly in a portal for a primary lens assembly, because the auxiliary lens assemblies lack the pivotally attached legs for going over the ears of the wearer that are commonly used to attach the primary lens assembly in the display device. Another disadvantage of the various prior art designs is that they cannot display a primary and auxiliary lens assembly combination.

It can thus be seen that there is a need to develop a design for a device capable of displaying both primary lens assemblies and auxiliary lens assemblies, which allows close comparison of the matching features of the primary lens assemblies and auxiliary lens assemblies, and which can be used in combination with the existing display devices of retail eyewear outlets.

SUMMARY OF THE INVENTION

A primary advantage of the present invention is that it provides a device capable of displaying both primary lens assemblies and auxiliary lens assemblies. Another advantage of the present invention is that it provides a display device for auxiliary lens assemblies that can be used in combination with existing retail outlet display systems that otherwise support only primary lens assemblies. Another advantage of the present invention is that it is easy to use and allows immediate removal of both the auxiliary lens assembly or the primary lens assembly.

Another advantage of the present invention is that it is simple and aesthetically attractive. Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

The present invention discloses an eyewear display mount capable of attaching to a primary lens assembly and supporting an auxiliary lens assembly such that the complementary assemblies may be displayed in combination. A primary lens assembly is capable of retaining a pair of primary lenses. An auxiliary lens assembly is capable of retaining a pair of auxiliary lenses. The auxiliary lens assembly may be removably attached to the primary lens assembly. In this manner, the person wearing the eyewear system has two lenses combining to alter the transmission of light to each eye.

In accordance with one aspect of the invention, there is disclosed a unique auxiliary eyewear display mount which is removably attachable to the bridge portion of a primary lens assembly. The display mount comprises a bridge clamp that is removably attachable to the bridge portion of a primary lens assembly. An arm extends outward from the bridge clamp. A cradle is attached to the arm for supporting an auxiliary lens assembly.

In a more preferred embodiment, the bridge clamp has a base attached to the arm. A pivot pin is attached to the base, and a lever is pivotally attached to the base by the pivot pin. A spring member is located on the pivot pin to urge the lever against the base, and thus secure the display mount to the primary lens assembly. In another preferred embodiment, an extension is formed on the base to further secure the display mount to the bridge portion of a primary lens assembly.

In another preferred embodiment, the cradle has an inner flange, an outer flange, and a relief between the inner and outer flanges. In a still more preferred embodiment, the arm is integral to the base.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The terms "right" and "left" as used herein are referenced from the perspective of a person wearing the primary and auxiliary lens assemblies. The references are intended to aide in the description of the device, and are not intended to be limiting, since the preferred embodiments of the device are generally symmetric.

Figure 1:
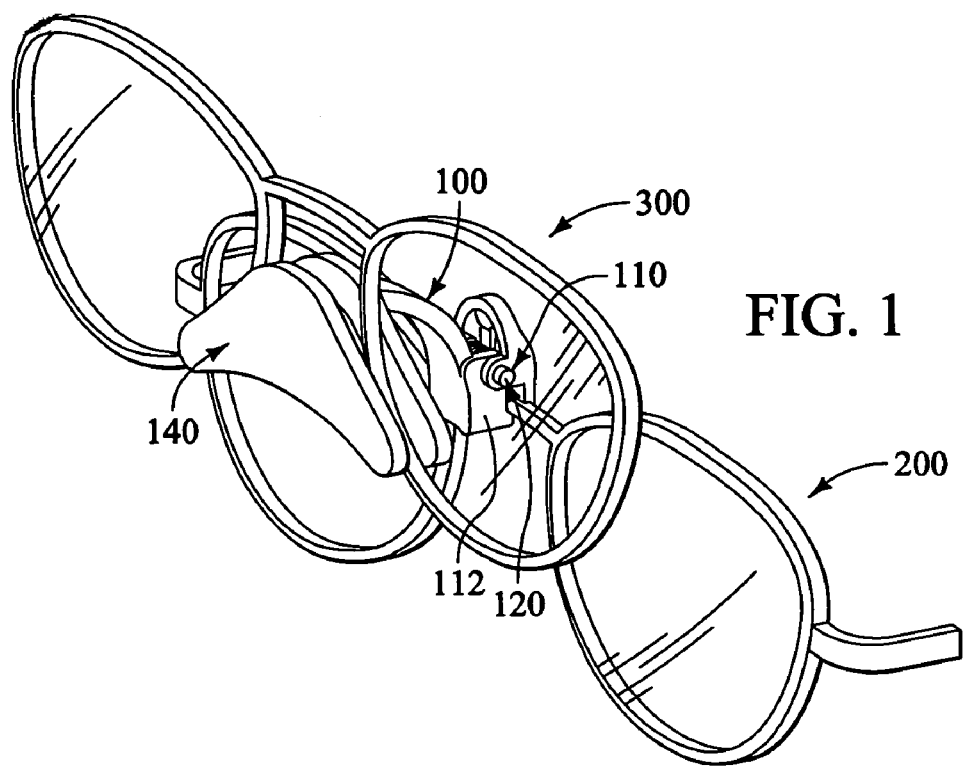
FIG. 1 is a front isometric view of a preferred embodiment of the present invention, disclosing an eyewear display mount attached to the bridge portion of a primary lens assembly, with an auxiliary lens assembly supported in the cradle of the display mount.

FIG. 1 is a front isometric view of a preferred embodiment of the present invention. In this view, an eyewear display mount 100 is attached to the bridge portion of a primary lens assembly 200. An auxiliary lens assembly 300 is supported on display mount 100.

Figure 2:
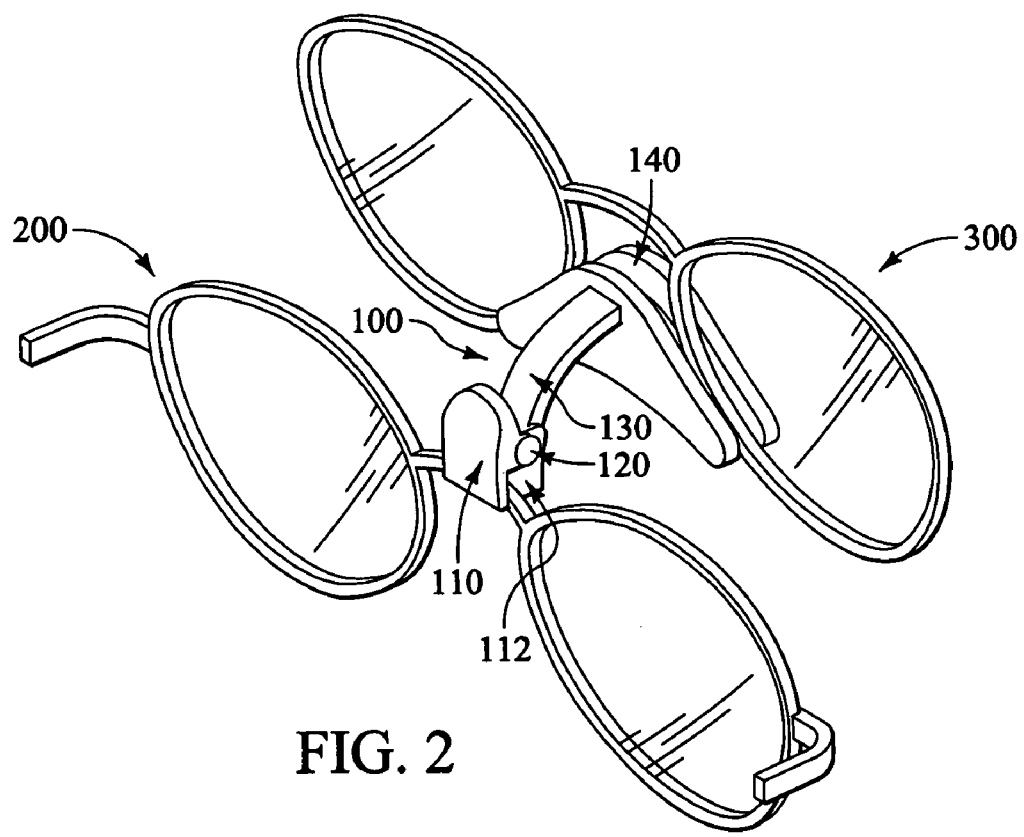
FIG. 2 is an isometric view of a preferred embodiment of the present invention.

FIG. 2 is an isometric view of a preferred embodiment of display mount 100. In the embodiment shown in this view, display mount 100 has a bridge clamp 110. Bridge clap 110 is attached to an arm 130. Arm 130 is attached to a cradle 140.

Figure 3:
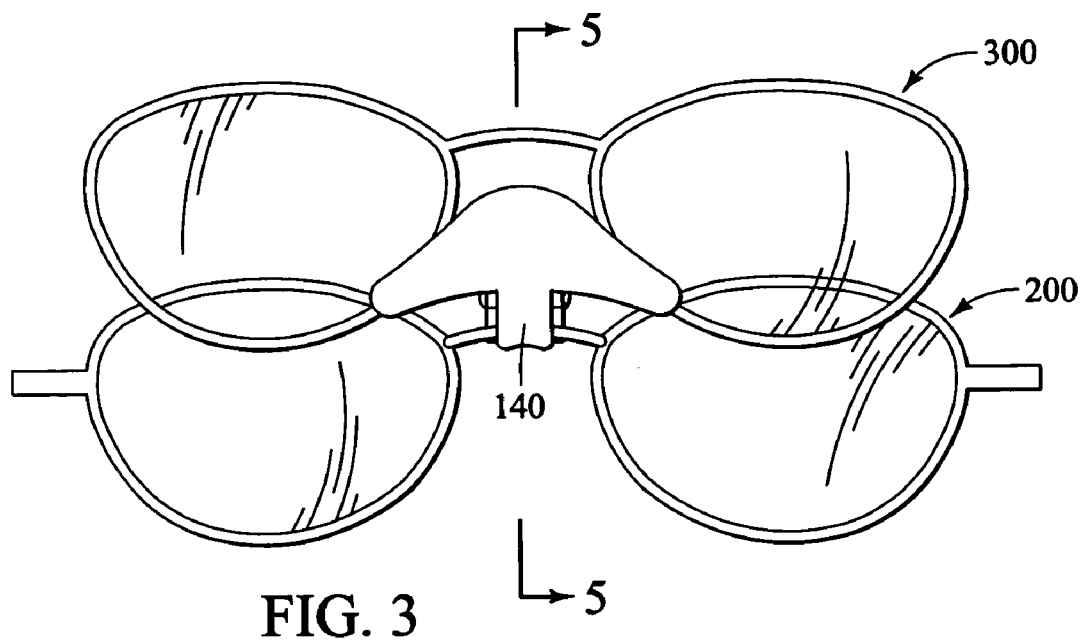
FIG. 3 is a side view of a preferred embodiment of the present invention disclosed in FIG. 2.

FIG. 3 is a side view of the same embodiment of display mount 100 shown if FIG. 2. Referring to FIGS. 2 and 3, bridge clamp 110 has a base 112 attached to arm 130. In a preferred embodiment, base 112 has a first sidewall 114 and a substantially parallel second sidewall 116. In a preferred embodiment, base 112 has an extension 118 extending between sidewall 114 and sidewall 116, and outward from base 112.

A pivot pin 120 is attached to base 112 between sidewall 114 and sidewall 116. A lever 122 is pivotally attached to base 112 by pivot pin 120. In a preferred embodiment, lever 122 has an upper portion 124 and a lower portion 126. In a still more preferred embodiment, lever 122 has an offset 128 that provides a radial distance from pivot pin 120 about which upper portion 124 and lower portion 126 pivot. As best seen in FIG. 2, a spring member 129 is located on pivot pin 120 to urge lever 122 against base 112.

In a preferred embodiment, cradle 140 has an inner flange 142 and a substantially parallel outer flange 144. A relief 146 is formed between inner flange 142 and outer flange 144.

Figure 4:
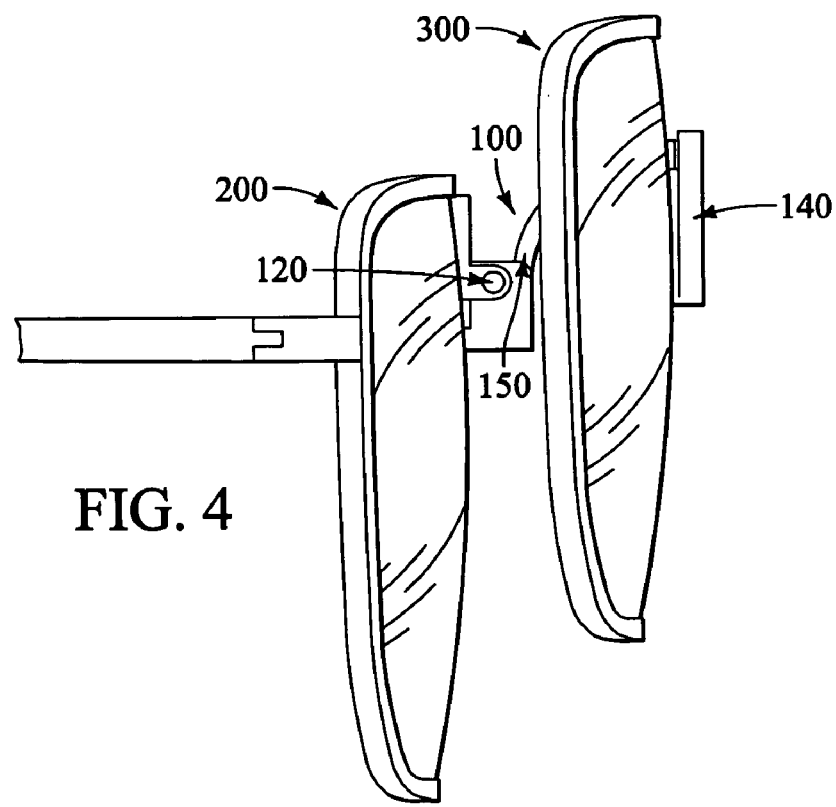
FIG. 4 is a rear isometric view of a preferred embodiment of the present invention, shown attached to a primary lens assembly and supporting an auxiliary lens assembly.
Figure 5:
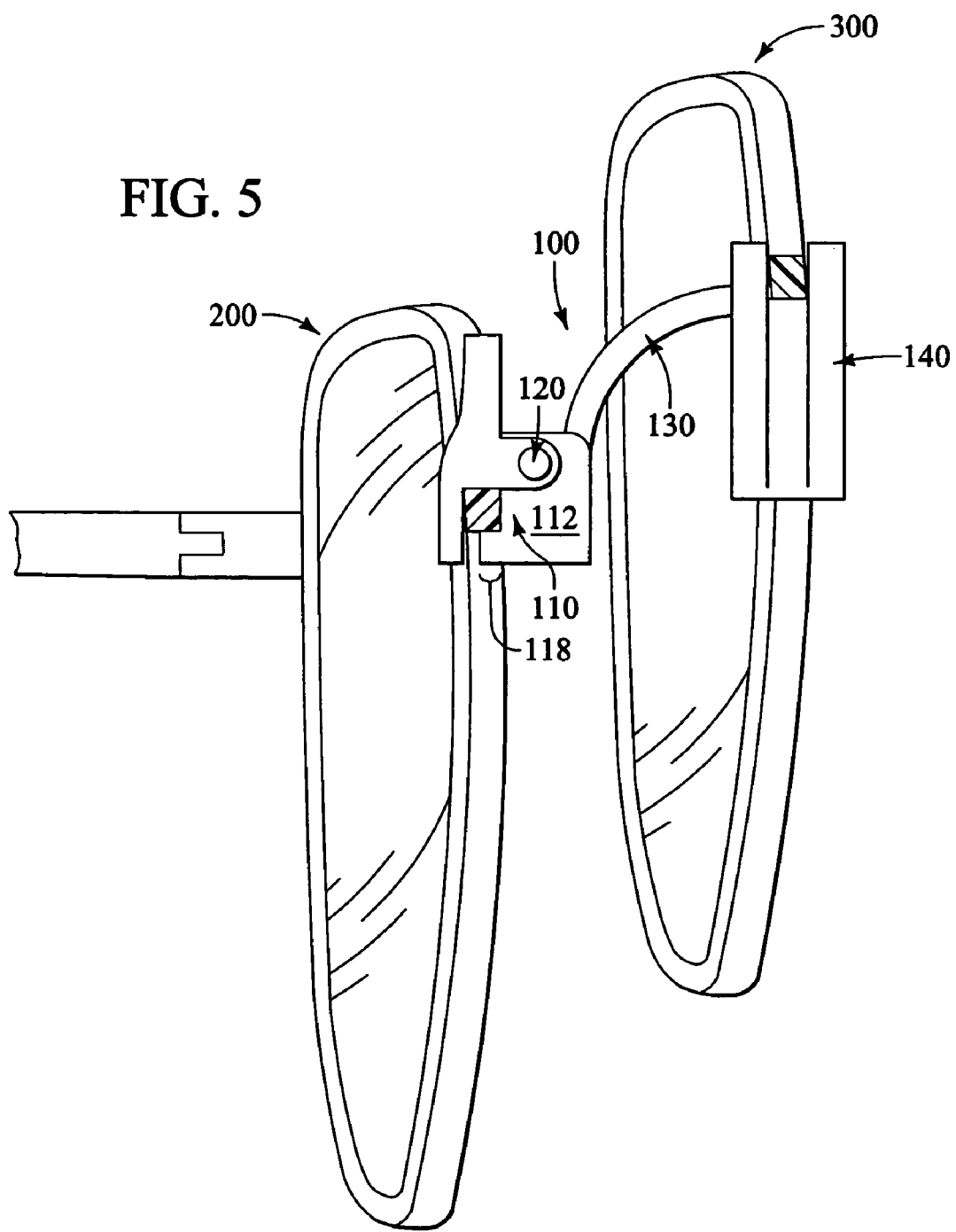
FIG. 5 is a front view of a preferred embodiment of the present invention, shown attached to a primary lens assembly and supporting an auxiliary lens assembly.
Figure 6:
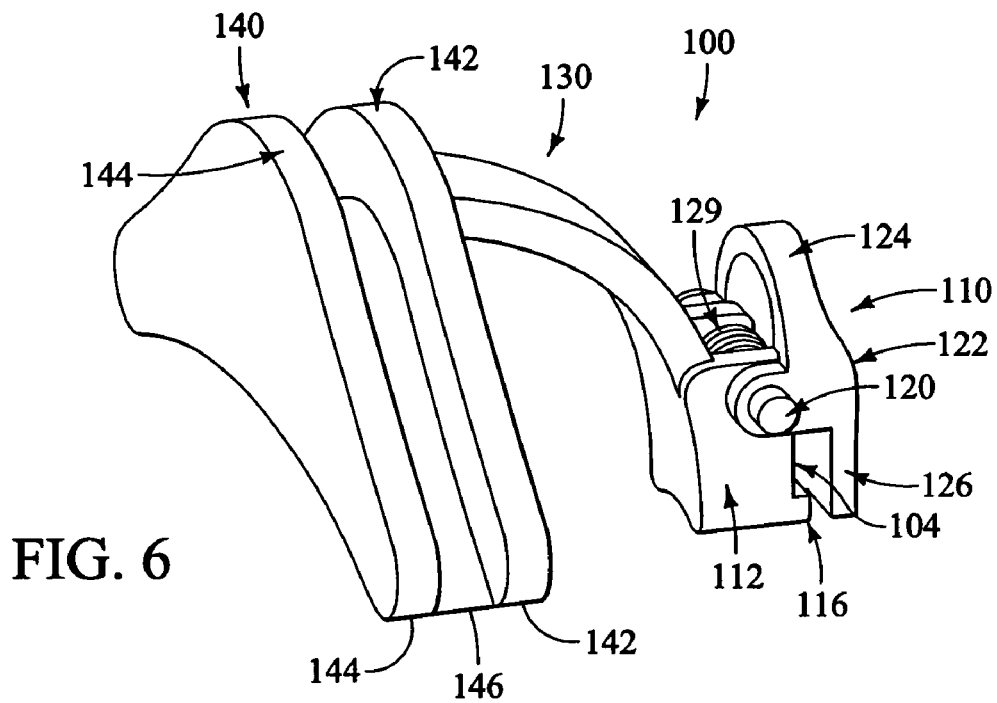
FIG. 6 is a side view of a preferred embodiment of the present invention, shown attached to a primary lens assembly and supporting an auxiliary lens assembly.

FIGS. 4, 5, and 6, illustrate the bridge clamp 110 of display mount 100 attached to the bridge portion of a primary lens assembly 200, and an auxiliary lens assembly 300 supported in cradle 140 of display mount 100.

Figure 7:
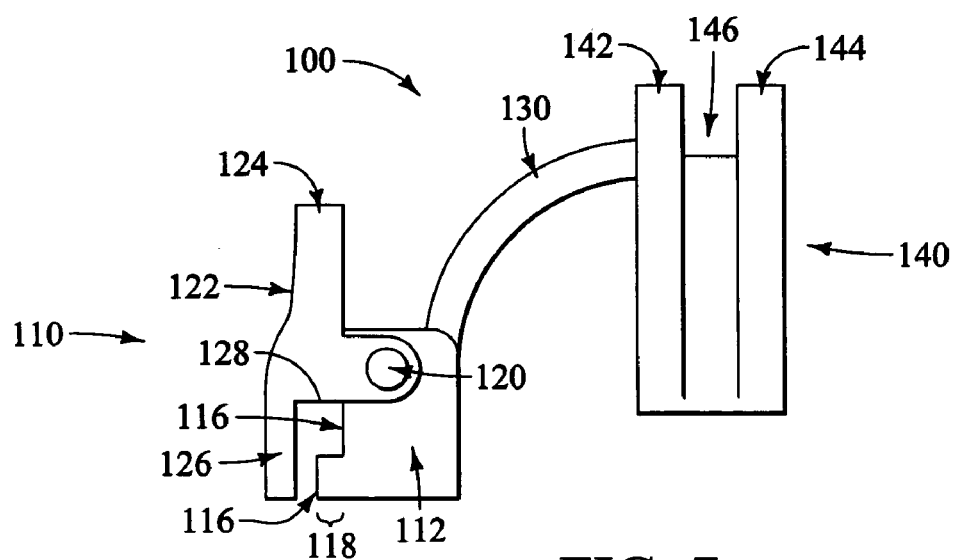
FIG. 7 is a cross-sectional side view of a preferred embodiment of the present invention, shown attached to a primary lens assembly and supporting an auxiliary lens assembly, with the device and lens assemblies sectioned as indicated in FIG. 5.

FIG. 7 is a cross-sectional side view of a preferred embodiment of display mount 100, shown attached to a primary lens assembly 200 and supporting an auxiliary lens assembly 300, with display device 100 and lens assemblies 200 and 300 sectioned as indicated in FIG. 5.

OPERATION OF THE PREFERRED EMBODIMENTS

FIG. 1 is an isometric view of a preferred embodiment of the present invention. In this view, a typical primary lens assembly 200 and a typical auxiliary lens assembly 200 are illustrated as displayed together by use of display mount 100. Bridge clamp 110 of display mount 100 can be securely clamped onto the middle bridge portion of a primary lens assembly 200. Arm 130 extends from bridge clamp 110. The opposite end of arm 130 is attached to cradle 140. Auxiliary lens assembly 300 can be placed into cradle 140.

Display mount 100 is attached to primary lens assembly 200 by applying sufficient finger pressure to upper portion 124 of lever 122 to overcome the compressive force of spring member 129. This provides an opening between lower portion 126 of lever 122, and base 112 of bridge clamp 110. Opened bridge clamp 110 is placed over the middle bridge portion of primary lens assembly 200 and released. When released, spring member 129 closes bridge clamp 110 securely on the middle bridge portion of primary lens assembly 200, as shown in FIGS. 1, and 4 through 7.

Auxiliary lens assembly 300 is located on display mount 100 by simply placing it in cradle 140 as also shown in FIGS. 1, and 4 through 7. In a preferred embodiment, inner flange 142 and outer flange 144 are spaced sufficiently apart to form a relief 146. Relief 146 is capable of receiving auxiliary lens assembly 300 between the left and right lenses, or lens frames, and/or the middle bridge portion. The multiple receiving means allows display mount 100 to work with numerous auxiliary lens assemblies 300 of various designs and sizes. In another preferred embodiment, cradle 140 is made of a compressible material, such as a foam rubber. In this embodiment, the compressibility of the material provides additional compressive forces to further secure auxiliary lens assembly 300 in cradle 140.

In this manner, auxiliary lens assembly 300 can be displayed in visible and comparable combination with primary lens assembly 200. Primary lens assembly 200 may in turn be mounted in many of the existing eyewear display devices utilized for retail sales. Use of the present invention thus allows a potential purchaser to view the compatibility of primary lens assembly 200 with auxiliary lens assembly 300, and to contemplate the advantages of the eyewear system. This also permits the potential purchaser to easily and quickly disassemble the display, without the need for instructions, assistance, or tools.

In a preferred embodiment best viewed in FIG. 2 and FIG. 4, bridge clamp 110 is comprised of base 112 pivotally attached to lever 122 by pivot pin 120. Spring member 129 urges lever 122 into contact with base 112, providing the necessary clamping force to secure display mount 100 to primary lens assembly 200.

In a preferred embodiment best viewed in FIG. 7, lever 122 includes features to enhance the engagement of bridge clamp 110 with the bridge portion of primary lens assembly 200. As shown, pivot 120 is attached to an offset 128. In the preferred embodiment shown in FIG. 7, offset 128 has a first side and a second side attached outside and adjacent to each of first and second sidewalls 114 and 116 respectively. This positioning allows spring member 129 to coil around pivot pin 120. Use of offset 128 further improves the release feature of display device 100 by lifting lower portion 126 upwards relative to the bridge member of primary lens assembly 200 when finger pressure is applied to upper portion 124 of lever 122.

The distance between offset 128 and lower portion 126 provides an allocation of space for the bridge member of primary lens assembly 200. It further provides opposing and generally perpendicular surfaces to enhance engagement with the bridge member of primary lens assembly 200. In another preferred embodiment, base 112 includes extension 118, which provides an opposing and generally perpendicular surface to sidewalls 114 and 116 in a configuration that further secures display mount 100 on primary lens assembly 200.

In an alternative embodiment not shown, lever 122 contains no offset, and the allocation of space for the bridge member of primary lens assembly 200 is provided by a comparable slot in base 112. In another embodiment not shown, lever 122 contains no offset, and offset 128 is instead provided on base 112. In another alternative embodiment, lever 122 and/or base 112 are made of a compressible material that eliminates the need for allocation of space for the bridge member of primary lens assembly 200.

It will be readily apparent to those skilled in the art, and the general principles defined herein may be applied to other embodiments and applications without departing from the spirit and scope of the present invention. One skilled in the art will specifically recognize that alternative arrangements of the disclosed components can achieve an equivalent function and result without departing from the spirit and scope of the present invention. As an example, offset 128 and lower portion 126 can be integrally formed and curved, in a hook style appearance.

We claim:

1. An auxiliary eyewear display mount comprising:
 a bridge clamp for a first lens assembly;
 an arm extending outward from the bridge clamp; and,
 a second lens assembly cradle attached to the arm.

2. The eyewear display mount of claim 1, the bridge clamp further comprising:
 a base attached to the arm;
 a pivot pin attached to the base;
 a lever pivotally attached to the base by the pivot pin;
 a spring member located on the pivot pin; and,
 whereas the spring member urges the lever against the base.

3. The eyewear display mount of claim 2, further comprising:
 an extension formed on the base.

4. The eyewear display mount of claim 2, further comprising:
 whereas the arm is integral to the base.

5. The eyewear display mount of claim 2, the lever further comprising:
 an upper portion;
 a lower portion; and,
 an offset approximately perpendicular to the lower portion.

6. The eyewear display mount of claim 1, the cradle further comprising:
 an inner flange;
 an outer flange; and,
 a relief between the inner flange and outer flange.

7. The eyewear display mount of claim 1, further comprising:
 whereas the cradle is made of a compressible material.

* * * * *